Patented Nov. 1, 1927.

1,647,304

UNITED STATES PATENT OFFICE.

JOHN F. NORTON, OF MATTAPAN, MASSACHUSETTS.

RESILIENT EQUALIZING SUPPORT FOR PISTON RINGS.

Application filed September 29, 1923. Serial No. 665,571.

My invention relates to resilient equalizing supports for the piston rings of internal combustion engines, said supports being so constructed as to fit into the annular grooves of internal combustion engine pistons behind the piston rings thereof for the purpose of supporting or holding the rings with equal pressure against the inner walls of the cylinder of said engine.

The object of the invention is to support and hold the piston ring with an equal and resilient automatic pressure of sufficient force at all parts of its periphery against the inner wall of the piston cylinder, so as to centralize the movements of the piston in the cylinder and equalize the wear on the inner wall of the cylinder; to prevent scoring the cylinder; the "piston slap"; passing of oil by the piston rings to the combustion chamber; formation of carbon; and furthermore, to prevent the piston rings from rotating in their grooves; to prevent fouling of spark plugs; to prevent unexploded gas in the combustion chamber from passing by the piston and getting into and diluting the oil in the crank case, which diluted oil ruins the motor; to make possible the continued use of the same piston rings; to cause the piston rings to conform to any eccentrically enlarged cylinders and to prevent such an enlargement in new cylinders. All of which cuts down the oil used at least one half; saves expensive repairs, such as reboring of cylinders, etc., and assures much higher compression, which thereby gives greater power, and causes a quieter running and a longer life motor.

The invention consists in a device of the character set forth comprising a strip of flat spring metal of polygonal form, the sides of said device being normally approximately straight, terminating in bends instead of angles, but which sides when in operative position in the piston behind the piston ring will be slightly curved outwardly.

The invention furthermore consists in a device of the character set forth combined with a piston and piston ring and located in the piston ring groove behind the piston ring.

Referring to the drawings:—

Like numerals refer to like parts throughout the several views of the drawings.

Figure 1:
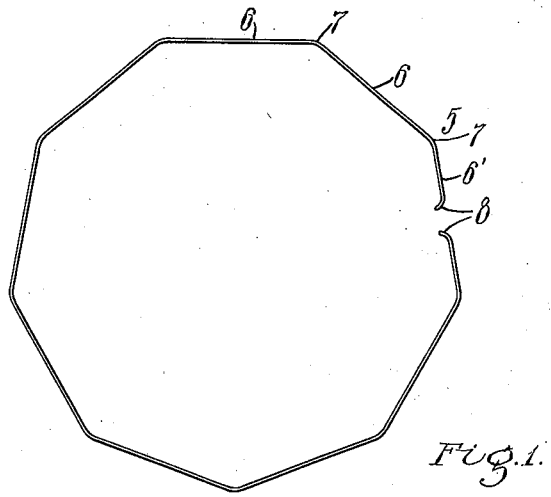
Figure 1 is a plan view of my improved equalizing support for piston rings.
Figure 2:
Fig. 2 is a side view of the support.

In the drawings, 5 is the equalizing support of my invention consisting of a strip of flat spring metal of polygonal form, the sides 6 thereof being normally approximately straight and the corners 7 being slightly rounded into bends, one of the sides 6' being split or divided and the ends 8 of the support being normally spaced apart. Each of the bends 7 is rounded on an arc described from a point within the outer boundary of the device. Each of the ends 8 terminates adjacent to one of said small arcs or bends and is bent inwardly so as to give the divided or split side of the device the same pressure and resiliency as the continuous sides thereof, otherwise the divided side would lie flat and offer no support to the piston ring at that portion thereof.

In Figure 1 the device of this invention is illustrated in the form which it assumes when in normal position before it is inserted in the piston ring groove and in that position the sides 6 are approximately straight.

Figure 3:
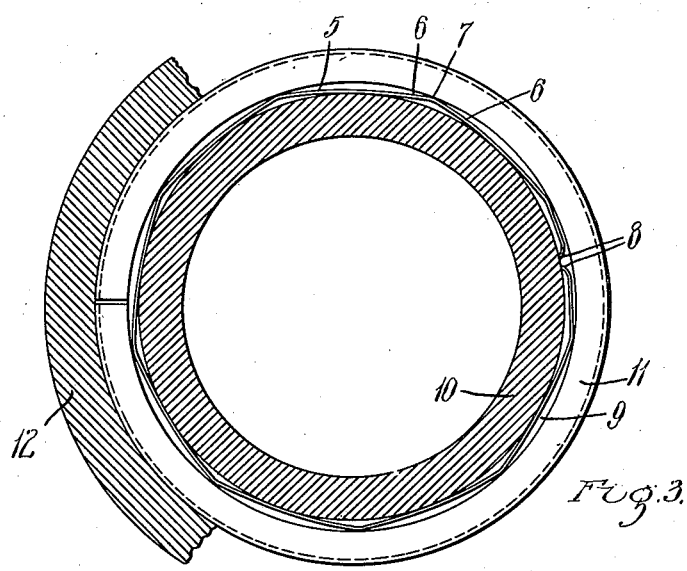
Fig. 3 is a sectional elevation taken transversely of a piston and cylinder of an internal combustion engine of well-known construction with the device of this invention positioned in the piston ring groove behind the piston ring.

In Fig. 3 the support 5 is illustrated positioned in an annular piston groove 9 provided in the periphery of a piston of well-known construction and behind a piston ring 11 which is located in the groove 9 of the piston 10. The piston 10 is located within a cylinder 12.

The equalizing support of my invention is constructed with the sides of the proper length for the particular size piston in which it is to be inserted, the length of the sides and the thickness of the metal preferably being varied according to the dimensions of the piston, the depth and width of the groove for the piston ring and the inside diameter of the piston ring, but the length of the side is to be far greater than the length of the arc of the small bends.

The support is formed of a strip of flat steel of the desired dimensions by means of suitable tools or machines, whereby when in its normal shape the sides will be flat or straight and the corners will be slightly curved or rounded into bends and the adjoining sides, when the device is being formed, stand somewhat at right angles to each other, thereby giving greater tension when in use.

The sides of the device of my invention constitute normally tangents or chords between the corners or bends, but when positioned in the piston ring groove of a piston, the sides 6 of the device of my invention are slightly curved, the ends 8 of the support being brought toward each other when the piston ring is inserted in the groove and thus the sides become to some extent arc-shaped instead of straight, the arcs lying within the outermost boundary of the device with their central portions always against the piston or bottom of the groove.

In the operation of the device hereinbefore described, it will be understood that there is only a slight constant expansion and contraction of the piston ring 11 during the movement of the piston in the cylinder sufficient to conform to the size of the cylinder in all its parts if any difference occurs due to wear or temperature.

With the aid of said small bends and with the central portion of the sides always being pressed against the piston or bottom of the groove, a spring pressure against the inner surface of the piston ring is obtained which constantly holds it with equal pressure in all its parts against the wall of the cylinder.

The central portion of the sides of the device can never move out of contact with and lose pressure against the piston at the bottom of the groove, because the pressure of the piston ring constantly pulls it tight and this would not be the case were the metal between the short bends, when in its normal condition, disposed in other than straight lines, or if, in other words, the distance between these short bends were longer when the device is in its normal condition than when it is first put into the groove.

I claim:—

1. As an article of manufacture, a resilient equalizing support for piston rings comprising a strip of spring metal of polygonal form, the sides of said support being normally approximately straight and its corners comprising outwardly curved small arcs or bends, the opposite ends of said strip of spring metal being bent inwardly.

2. As an article of manufacture, a resilient equalizing support for piston rings comprising a strip of spring metal of polygonal form, the opposite ends of said strip of spring metal being bent inwardly.

In testimony whereof I have hereunto set my hand.

JOHN F. NORTON.